Aug. 24, 1948.  A. J. SLOVACK  2,447,777
TIRE DEFLATION INDICATOR
Filed April 26, 1946  2 Sheets-Sheet 1
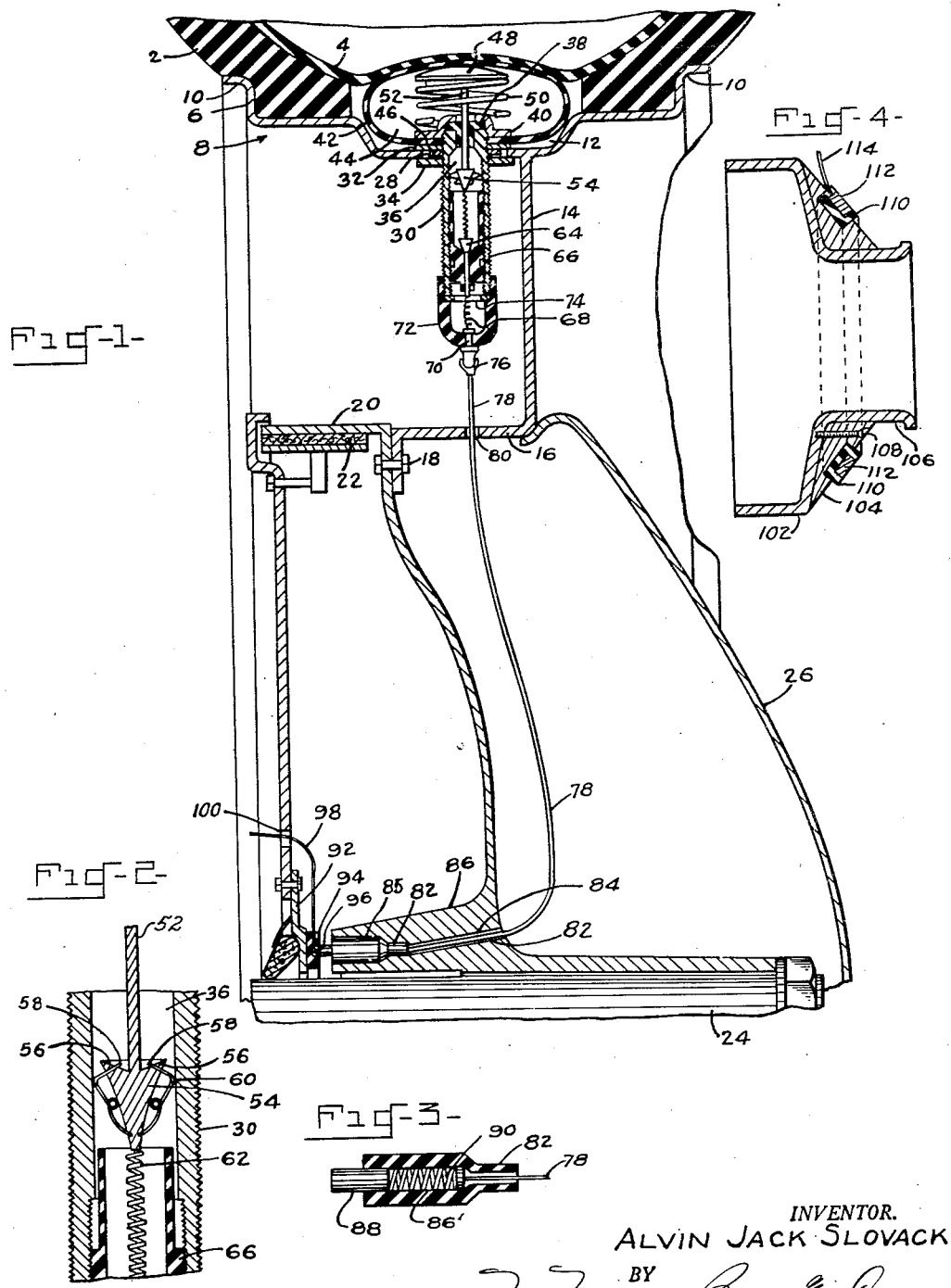
INVENTOR.
ALVIN JACK SLOVACK Aug. 24, 1948.  A. J. SLOVACK  2,447,777
TIRE DEFLATION INDICATOR
Filed April 26, 1946  2 Sheets—Sheet 2
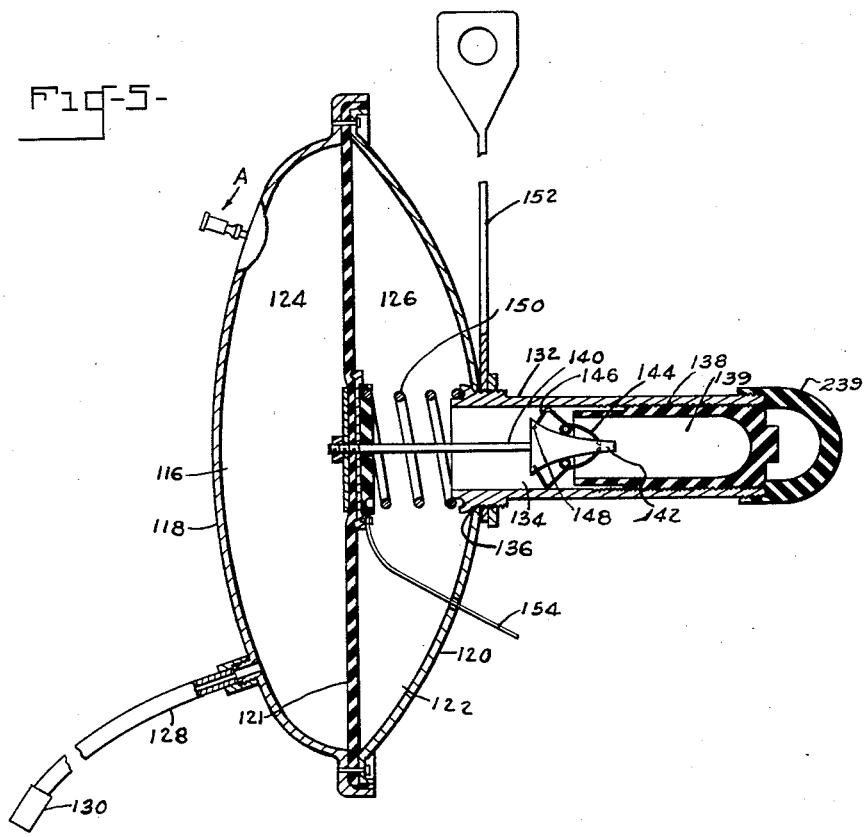
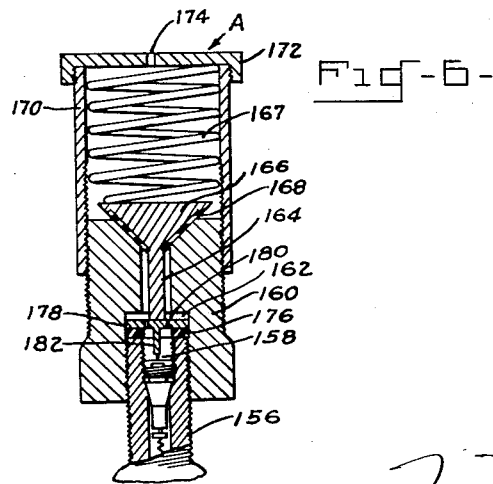
INVENTOR
ALVIN JACK SLOVACK Patented Aug. 24, 1948

2,447,777

UNITED STATES PATENT OFFICE 2,447,777

TIRE DEFLATION INDICATOR

Alvin J. Slovack, Houston, Tex.

Application April 26, 1946, Serial No. 665,117

1 Claim. (Cl. 200—58)

This invention relates to means for indicating the degree of inflation of pneumatic tires.

An object of the invention is to provide means that can be readily installed on a tire wheel of an automobile or truck, for automatically warning the driver of the vehicle when the air pressure in the tire has decreased below predetermined limits.

Another object of the invention is to provide means that can be readily installed in a vehicle, for warning the driver when the air pressure in any one or more of its tires has increased beyond predetermined limits.

A further object of the invention is to provide automatic tire inflation and deflation means that are readily installable in a vehicle without extensive alterations, and without the use of cumbersome devices which might interfere with the efficient operation of the vehicle, and that may be manufactured at reasonably low cost.

Other objects and advantages of the invention will become apparent from the following description of a preferred embodiment thereof as illustrated in the accompanying drawings, and in which—

Figure 1 is a fragmentary sectional elevation taken on a vertical plane containing the axis of a wheel, with the invention installed.

Figure 2 is a fragmentary sectional elevation in detail of a portion of the mechanism shown in Figure 1.

Figure 3 is a sectional elevation in detail of the brush contact device shown in the lower left corner of Figure 1.

Figure 4 is a sectional elevation of a front wheel grease retainer with built-in collector ring.

Figure 5 is a sectional elevation of an indicator especially suited for indicating excess tire pressures, and having means for releasing such excess pressure, and Figure 6 is a sectional elevation in detail, of the pop-off valve shown in the upper left corner of Figure 5.

Referring to the drawings, Figure 1 shows a tire casing 2 with an inner tube 4 mounted on the rim 6 of a wheel generally indicated at 8, the rim 6 having outer flanges 10 and a peripheral groove 12. A web 14 connects the rim 6 with a wheel hub 16 which is secured by bolts 18 onto a brake drum 20 engageable on its inner surface by a brake lining 22 in the usual manner. The drum 20 is carried rotatably on an axle 24, a hub cap 26 being provided for covering the projecting axle 24.

The rim 6 has an aperture 28 formed in groove 12, through which extends a light metal externally threaded hollow cylindrical stem 30 held in the aperture by upper and lower nuts 32 and 34 threaded onto the stem. An axial bore 36 in the stem is reduced at its upper end through which is inserted a reduced lower portion of a plastic bushing 38 having a central axial bore, the enlarged upper portion of the bushing being held in position on the upper end of the stem 30 by an axially apertured flange nut 40 threaded onto the stem 30. A rubber inflatable diaphragm member 42 has a chamber 44 with an aperture 46 formed in the wall of the member 42, the upper end of the stem 30 extending into the aperture 46 and the chamber 44 as shown, the edges of the aperture 46 being clamped tightly and sealed between the flange nut 40 and the nut 32.

A plunger head 48 is pressed against the upper inner wall surface of the diaphragm member 42 by a spring 50 acting between the head 48 and the flange nut 40. A rod 52, secured at its upper end to the plunger head 48, extends downward through the flange nut 40, the insulating bushing 38 and into the stem bore 36, its lower end 54 being formed into a point having side apertures 56 through which are slidable the upper ends 58 of a brass hair spring 60 secured at its lower ends to the pointed end 54 of the rod 52 by soldering or otherwise. A coil spring 62 is soldered at its upper end to the pointed end 54 and is soldered at its lower end to the enlarged head of a valve pin 64 movably seated in and sealing the axial bore of an insulating bushing 66 threaded into the threaded portion of axial bore 36 in the stem.

The lower end of pin 64 has soldered to it a spring 68 soldered at its lower end to a contact member 70 extending through an insulating cap 72 threaded onto the lower end of the stem 30 and provided with a sealing washer 74. The lower end of contact member 70 is rounded to receive a spring clip 76 connected to a wire 78 extending through an aperture 80 in the wheel hub 16 and into an insulating bushing 82 set in a bore 84 in the hub 86 of the brake drum. The bushing 82 is enlarged at 85 and has an axial bore 86 in which is slidable a contact plunger or brush 88 biased to protrude from the bore by a spring 90, the plunger 88 and wire 78 being electrically connected.

Flange 92 has secured to its outer surface an insulating ring 94 having an annular metal collector ring 96 in position so that rotating contact plunger 88 bears against the collector ring as it revolves. The collector ring 96 is connected by a wire 98 which extends through an aperture 100 to a suitable lamp or other electrical indicating device actuated by current passing through wire 98.

As shown in Figure 4, a front wheel grease retainer 102 may be formed of plastic fibre or other suitable material, with an insulating base ring 104 secured around its neck 106 by means of screws 108, with an insulating ring 110 having an annular recess for the reception of a metal collector ring 112, which has a wire 114 leading therefrom similarly to wire 98 in Figure 1. When the device shown in Figure 4 is used, the angle along which the plunger 88 presses would preferably be changed to bear evenly on collector ring 112.

It will thus be observed that as plunger head 48 moves downwards responsive to movement of the tube wall 4, the pointed end 54 of the rod 52 is pressed down into the insulating bushing 66, the ends 58 of the spring 60 being compressed into the apertures 56 as it descends, thus breaking the electrical contact of the spring 60 with the wall of the stem 30. As the plunger 48 rises responsive to movement of tube wall 4, it pulls the pointed end 54 out of the insulating bushing 66, allowing the spring 60 to expand into electrical contact with the stem 30, and lighting to an indicating lamp connected in the circuit with wire 78 and a source of power such as a battery.

Shown in Figures 5 and 6 is a device suitable for indicating excess pressures in auto truck tires due to overloading, over-inflation, high ambient temperature, or high speeds. This device has a housing 116 comprising oppositely dished halves 118 and 120 joined at their edges, and having a rubber diaphragm 121 separating the chamber 122 into two chambers 124 and 126, the diaphragm being clamped between the edges of the dished halves to form a tight seal. An air hose 128 leads into chamber 124 and has a threaded fitting 130 for engaging over the tire tube valve cap of a tire so as to depress the valve pin of the tube valve and allow air from the tire tube to flow freely into chamber 124. A metal bushing 132, having an axial bore 134, extends through an aperture 136 in dished half 120.

An insulating bushing 138 having a recess 139 is threaded into the bore 134, with an end cap 239 threaded onto bushing 132 for closing its end. A rod 140 is secured at one end to the diaphragm 121 and is enlarged at its other end to form a point 142 carrying and connected to a contact spring 144 with its ends 146 slidable in apertures 148 in the point 142. A spring 150 acts between the diaphragm 121 and the bushing 132. A metal bracket 152 is secured at one end to the bushing 132 for attachment to the wheel or other suitable member. As pressure in the tire increases, the diaphragm 121 is pushed to the right, forcing the point 142 into insulating bushing 138 and squeezing its spring 144 out of contact with the bushing 132, thus breaking the electrical contact. As the tire pressure returns to normal, the rod 140 assumes the position shown in Figure 5, allowing current to flow through a wire 154 and the rod 140 through the spring ends 146 to bushing 132 and out through bracket 152, so as to actuate a warning lamp connected with a battery to the bracket 152 and wire 154.

Dished half 118 carries an outlet valve stem with a conventional valve core and pin 158. A body member 160 having an axial bore 162 is threaded onto the valve stem. A plunger shaft 164 extends loosely through the bore 162, with its upper end 166 biased by spring 167 to seat on the conical upper end of the bore 162, a rubber gasket 168 providing a tight seal. Casing 170 and cap 172 hold the spring 167 in place, the cap 172 having an air outlet hole 174. A rubber gasket 176 forms a tight seal and seat for the lower enlarged end 178 of the plunger 164, which has air passage holes 180, and has a downward projection 182 for depressing the pin 158 of the valve to give air out of chamber 124 access to plunger 164. When the air pressure in the tire and hence in chamber 124 is too great, plunger 164 is pushed upward by air pressure, allowing some of the air to escape through hole 174, and thus reducing tire pressure.

Although I have described a preferred embodiment of my invention in specific terms, it is to be understood that numerous changes may be made in size, shape, material and arrangement without departing from the spirit and scope of the invention as claimed.

I claim:

In a signaling device for indicating a change in pressure of a pneumatic tire tube, including an air-pressure-actuated means operatively connected to a tire tube for actuating an electric switch, the improvement comprising an electric switch including a stationary and a movable contact, said stationary contact comprising a tubular sleeve of current-conducting material, and a tubular bushing of insulating material, said bushing lining a portion of the inner periphery of said sleeve and merging with an unlined portion thereof to provide an annular shoulder, said movable contact comprising a plunger axially disposed in said sleeve, means operatively connecting said plunger to said pressure-actuated means whereby to reciprocate said plunger axially in said sleeve, said plunger including a head, said head being formed with a substantially radially-directed aperture therein, a radially outwardly-loaded contact spring fixed to said head, said spring including an outwardly-directed portion and a free end, said free end being slidable in said aperture, said plunger and head being normally positioned in said sleeve with said outwardly-directed portion of said spring in engagement with said unlined portion of said sleeve whereby to provide a normally closed switch, and said plunger being movable by said pressure-actuated means in a direction to engage said outwardly-directed portion of said spring with said annular shoulder of said bushing whereby to move said free end of said spring radially inwardly in said aperture and retract said outwardly-directed portion of said spring from engagement with said unlined inner periphery of said sleeve and open said switch.

ALVIN J. SLOVACK.

REFERENCES CITED

The following references are of record in the file of this patent:

UNITED STATES PATENTS

| Number | Name | Date |
|---|---|---|
| 1,183,486 | Pardue | May 16, 1916 |
| 1,410,297 | Harman | Mar. 21, 1922 |
| 1,657,406 | McGuire | Jan. 24, 1928 |
| 1,960,662 | Como et al. | May 29, 1934 |
| 2,113,957 | Androsky | Apr. 12, 1938 |
| 2,260,246 | Woodruff et al. | Oct. 21, 1941 |